United States Patent
Shirai et al.

(10) Patent No.: US 12,469,126 B2
(45) Date of Patent: Nov. 11, 2025

(54) IMAGE ANALYSIS DEVICE, IMAGE ANALYSIS METHOD, AND IMAGE ANALYSIS PROGRAM

(71) Applicant: FUJIFILM Healthcare Corporation, Chiba (JP)

(72) Inventors: Toru Shirai, Chiba (JP); Ryota Satoh, Chiba (JP); Tomoki Amemiya, Chiba (JP); Yoshitaka Bito, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 440 days.

(21) Appl. No.: 17/457,280

(22) Filed: Dec. 2, 2021

(65) Prior Publication Data

US 2022/0198652 A1      Jun. 23, 2022

(30) Foreign Application Priority Data

Dec. 17, 2020   (JP) ................. 2020-209618

(51) Int. Cl.
| | | |
|---|---|---|
| *G06T 7/00* | (2017.01) | |
| *A61B 5/00* | (2006.01) | |

(Continued)

(52) U.S. Cl.
CPC .......... *G06T 7/0012* (2013.01); *A61B 5/0042* (2013.01); *A61B 5/055* (2013.01);
(Continued)

(58) Field of Classification Search
CPC ..................... G06T 7/0012; G06T 7/11; G06T 2207/10088; G06T 2207/20021; G06T 2207/30016; G06T 2207/10081; G06T 2207/10104; A61B 5/0042; A61B 5/055; A61B 5/4088; A61B 2576/00; A61B 6/032; A61B 6/501; A61B 6/5211; A61B 8/0808; A61B 8/5215
See application file for complete search history.

(56) References Cited

U.S. PATENT DOCUMENTS

| | | | |
|---|---|---|---|
| 10,964,018 B2 * | 3/2021 | Marrero Callicó et al. ................. G06V 10/763 | |
| 2009/0252391 A1 | 10/2009 | Matsuda et al. | |
| 2020/0074635 A1 | 3/2020 | Satoh et al. | |

FOREIGN PATENT DOCUMENTS

| | | |
|---|---|---|
| CN | 102088910 A | 6/2011 |
| CN | 109498019 A | 3/2019 |

(Continued)

OTHER PUBLICATIONS

Sato Ryota, Image Processing Device, Image Processing Method, Image Processing Program, and Magnetic Resonance Imaging Device, machine translation of Japan patent publication No. 2020031848 (Year: 2020).*

(Continued)

*Primary Examiner* — Vu Le
*Assistant Examiner* — Lei Zhao
(74) *Attorney, Agent, or Firm* — Paul Teng

(57) ABSTRACT

An image including contrast is standardized and an area is divided, a measurement cross section that most matches a measurement cross section determined to be appropriate for measuring a predetermined index is determined based on a feature of a notable tissue in the divided area, and a measurement value serving as an index is calculated in the measurement cross section.

19 Claims, 9 Drawing Sheets

(51) Int. Cl.
*A61B 5/055* (2006.01)
*G06T 7/11* (2017.01)

(52) U.S. Cl.
CPC ...... *G06T 7/11* (2017.01); *G06T 2207/10088* (2013.01); *G06T 2207/20021* (2013.01); *G06T 2207/30016* (2013.01)

(56) References Cited

FOREIGN PATENT DOCUMENTS

| | | | |
|---|---|---|---|
| JP | 2001-137230 A | 5/2001 | |
| JP | 2004-174220 A | 6/2004 | |
| JP | 2019-74343 | 5/2019 | |
| JP | 2020-031848 A | 3/2020 | |
| WO | WO 2007/114238 A1 | 10/2007 | |
| WO | WO 2012/074039 A1 | 6/2012 | |
| WO | WO-2019113712 A1 * | 6/2019 | ............. A61B 5/055 |
| WO | WO-2021127056 A1 * | 6/2021 | ........... A61B 5/4312 |

OTHER PUBLICATIONS

Kazunari Ishii, Clinical impact of the callosal angle in the diagnosis of idiopathic normal pressure hydrocephalus, Eur Radiol (2008) 18: 2678-2683 (Year: 2008).*

Nicola Benedetto, A new quantitative method to assess disproportionately enlarged subarachnoid space (DESH) in patients with possible idiopathic normal pressure hydrocephalus: The Silver index, Clinical Neurology and Neurosurgery 158 (2017) 27-32 (Year: 2017).*

Schweitzer, What is the best reference site for a single MRI slice to assess wholebody skeletal muscle and adipose tissue volumes in healthy adults?, Am J Clin Nutr 2015; 102:58-65 (Year: 2015).*

Japanese official action dated Oct. 1, 2024 (and English translation thereof) in connection with Japanese Patent Application No. 2020-209618.

Chinese official action dated May 19, 2025 (and English translation thereof) in connection with Chinese Patent Application No. 2021115144706.

* cited by examiner

Evans index

CORPUS CALLOSUM ANGLE

IMAGE ANALYSIS DEVICE, IMAGE ANALYSIS METHOD, AND IMAGE ANALYSIS PROGRAM

BACKGROUND OF THE INVENTION

1. Field of the Invention

The present invention relates to an image analysis device that provides a diagnostic index of a disease or the like based on an image acquired by a medical imaging device, and more particularly to a technique for showing, as an index, an abnormality of a brain which is important in determining dementia.

2. Description of the Related Art

In the diagnosis of various diseases, medical imaging devices such as an X-ray imaging device, a CT device, an ultrasonic imaging device, an MRI device, or the like are widely used as effective units. The diagnosis is performed by a doctor confirming an image to be inspected obtained from these medical imaging devices. Further, a change in shape of a tissue projected on the image may be measured, and a measured value may be used as an index for performing the diagnosis. Therefore, a technique for performing measurement and outputting a diagnostic index is also developed in a medical imaging device or an image processing device that receives image data from the medical imaging device. When the measurement is performed with the device, for example, an image including a target tissue is displayed on a display device, information such as a location to be measured or the like is input, via an input unit, to the displayed image by a doctor, an engineer, or the like (hereinafter referred to as a user), and the device receives the information, calculates a measurement value, and provides a result.

Proposed is a technique in which time and effort of an input by a user is omitted, an area to be measured (ROI: region of interest) is automatically determined from a plurality of cross sections, and a measurement value is calculated (refer to JP-A-2019-74343). In the technique described in JP-A-2019-74343, when the ROI is automatically determined, in order to eliminate variations in measurement caused by an individual difference in an imaging target, anatomical standardization is performed on a target tissue (here, a brain), and data of an anatomical area allocated on a standard brain is provided as a candidate for the ROI.

SUMMARY OF THE INVENTION

However, for example, a modality of an imaging device is different, and when an MRI device is used, a diagnostic image has significantly different image resolution and contrast depending on a difference in an imaging condition (an imaging parameter), such that it is difficult to maintain accuracy of determining a measurement cross section and a measurement location for various images having different image quality only by performing the anatomical standardization.

In recent years, research on brain findings of dementia and brain diseases having similar dementia symptoms is performed, and a procedure for diagnosing dementia is clarified from various brain findings. One of the brain diseases is normal pressure hydrocephalus, and it is difficult to identify and diagnose, as dementia, secondary normal pressure hydrocephalus (sNPH) and idiopathic normal pressure hydrocephalus (iNPH) included in the normal pressure hydrocephalus, such that a guideline for diagnosing sNPH and iNPH with image diagnosis is generated. The iNPH guideline includes indexes such as Evans index, a corpus callosum angle, or the like, and asymptomatic ventricular enlargement having DESH findings. Evans index has a diagnostic index of iNPH indicating whether or not a ratio of a maximum width between anterior horns of bilateral ventricles to a width of a cranial cavity at that portion exceeds 0.3. With respect to the corpus callosum angle, a corpus callosum angle in an MRI coronal section perpendicular to anterior commissure and posterior commissure passing through the posterior commissure is steep (90 degrees or less), which becomes a diagnostic index that can determine Alzheimer's disease. The DESH finding becomes a diagnostic index that can determine Alzheimer's disease from minimization of a high fornix portion with an unbalanced enlargement of a subarachnoid cavity, and its high sensitivity and specificity.

When a doctor measures and calculates such a diagnostic index from an image, an image of an appropriate modality and an image of a contrast are used depending on the diagnostic index. For example, in the case of an MR image, Evans Index uses a T2-weighted image in which a cerebrospinal fluid is depicted as a highest signal area or a lowest signal region and a FLAIR image, and a T1-weighted image is desirably used for the corpus callosum angle. Therefore, when a user tries to automatically perform measurement from an input diagnostic image, it is required to prepare a diagnostic image corresponding to the index, which causes a significant burden.

Since these indexes are calculated from a measurement value of a fine shape of the brain, the value may significantly vary depending on a slight difference in a measurement cross section (a slice location), such that selecting an appropriate slice location is significantly important. However, it is difficult to select an appropriate measurement cross section (the slice location), and even when the doctor performs measurement, it is difficult to determine an appropriate cross section for measuring the corpus callosum angle with only one coronal cross section (a COR cross section). Similarly, for other indexes, it is difficult to determine an appropriate cross section with respect to subjects having different ages, symptoms, or the like.

An object of the present invention is to provide an image analysis device and an image analysis method capable of measuring a tissue with high accuracy even for images having different modalities, types, and imaging conditions.

In order to solve the object, the present invention standardizes an image including contrast and divides an area, determines a measurement cross section that most matches a measurement cross section determined to be appropriate for measuring a predetermined index based on a feature of a notable tissue in the divided area, and calculates a measurement value serving as an index in the measured cross section.

An image analysis device of the present invention includes: an image receiving unit configured to input a diagnostic image and an imaging condition of the diagnostic image; an image standardizing unit configured to standardize the diagnostic image; an area dividing unit configured to extract an area of a notable tissue from the diagnostic image standardized by the image standardizing unit; a slice location determining unit configured to determine, based on a feature of the area-divided notable tissue, a slice location in the standardized diagnostic image; a measurement unit configured to measure a notable tissue at the slice location determined by the slice location determining unit; and an index calculating unit configured to calculate an index by using a measurement value of the notable tissue measured by the measurement unit. The area dividing unit divides an area based on the imaging condition of the diagnostic image so that a pixel value of the divided area becomes a predetermined standard pixel value (label).

An image analysis method of the present invention for inputting a diagnostic image and calculating an index of a specific disease, the method including: a step of inputting the diagnostic image and an imaging condition of the diagnostic image; an image standardizing step of standardizing the diagnostic image; an area dividing step of extracting an area of a notable tissue from the standardized diagnostic image; a step of determining a slice location in the standardized diagnostic image based on a feature of the area-divided notable tissue; a step of measuring a predetermined notable tissue at the determined slice location; and a step of calculating an index by using a measurement value of the measured notable tissue. In the area dividing step, the area is divided based on the imaging condition so that a pixel value of the divided area becomes a predetermined standard pixel value (label).

An image analysis program of the present invention is a program that causes a computer to execute the above-described steps.

In this specification, the term "cross section" includes both a cross section such as an axial cross section, a coronal cross section, and a sagittal cross section, and a cross section at a predetermined slice location.

According to the present invention, accurate measurement can be performed regardless of a difference in a modality and an imaging condition, by standardizing an image including image quality using the imaging condition. By determining a slice location based on a feature of a notable tissue standardized in this manner, the most appropriate slice location for index calculation can be determined, such that erroneous measurement of the index caused by a slight difference in the slice location can be prevented.

BRIEF DESCRIPTION OF DRAWINGS

FIG. 4A is a diagram illustrating an image of an axial cross section for measuring Evans Index, and FIG. 4B is a diagram illustrating an image of a coronal cross section for measuring a corpus callosum angle;

FIG. 9A is a diagram illustrating an axial cross section, and FIG. 9B is a diagram illustrating a coronal cross section.

DESCRIPTION OF THE PREFERRED EMBODIMENTS

Hereinafter, embodiments of an image analysis device of the present invention will be described with reference to the drawings.

First Embodiment

Figure 1:
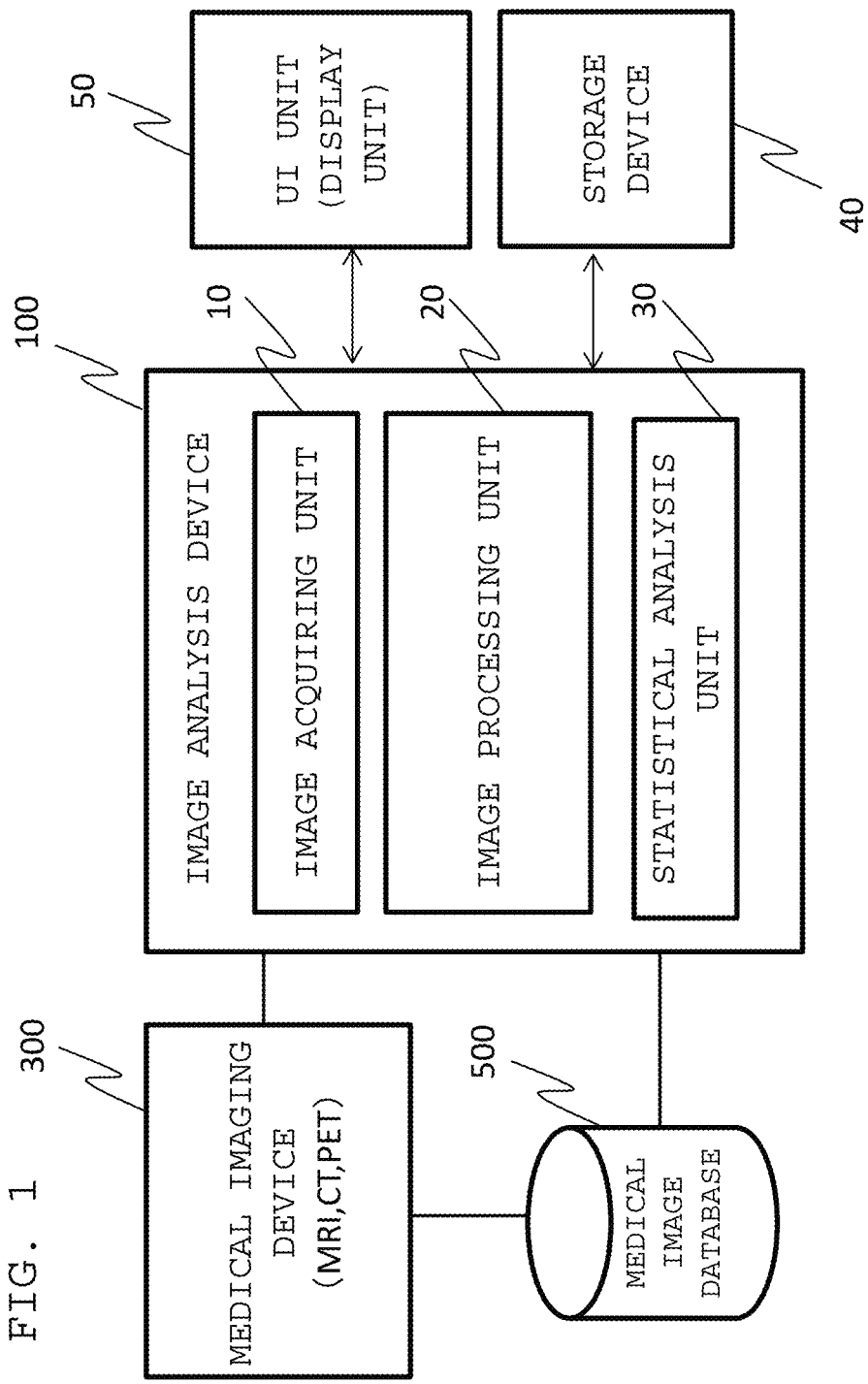
FIG. 1 is a diagram illustrating a configuration outline of a medical imaging device and an image analysis device.

An image analysis device 100 includes, as illustrated in FIG. 1, an image acquiring unit (an image receiving unit) that acquires an image captured by a medical imaging device 300, an image processing unit 20 that performs various processing by using the acquired image, a statistical analysis unit 30 that performs statistical processing by using a large number of images, a storage device 40 that stores data required for processing, a processing result, or the like, and a UI unit 50 including a display unit for displaying an image, a measurement value, a GUI, or the like which are processing results, an input unit, or the like.

The image analysis device 100 may be connected to the medical imaging device 300 and a database 500 including a large number of images. The medical imaging device 300 is not limited to a single device, but may be a plurality of devices installed at different locations, or may be a plurality of types of devices having different modalities. Examples of devices having different modalities include an MRI device, an X-ray imaging device, an ultrasonic imaging device, a CT device, a PET device, or the like.

The image acquiring unit 10 corresponds to an image receiving unit that inputs a diagnostic image and an imaging condition of the diagnostic image, acquires image data to be processed and its DICOM information (various information including subject information and an imaging condition attached to an image) via wire, wireless, a portable medium, a network, or the like, and passes the acquired image data and DICOM information to the image processing unit 20 or the statistical analysis unit 30.

Figure 2:
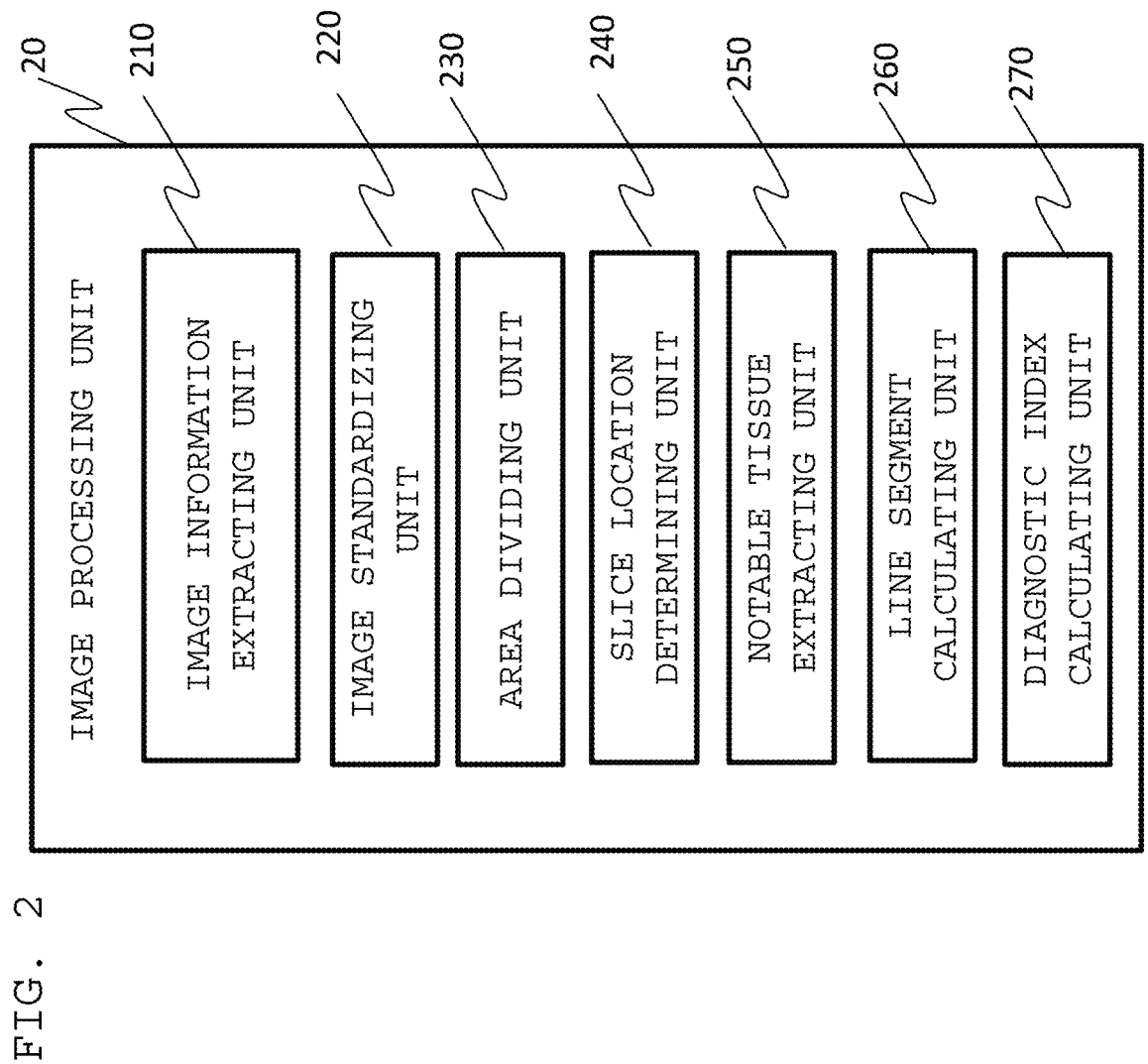
FIG. 2 is a functional block diagram illustrating an image processing unit of the image analysis device.

The image processing unit 20 mainly performs processing such as image standardization, tissue segmentation, determination of a slice location, predetermined measurement, and index calculation for an image to be measured (a measurement image). Therefore, the image processing unit 20 includes, as illustrated in FIG. 2, an image information extracting unit 210 that extracts image information from the data acquired by the image acquiring unit 10, an image standardizing unit 220 that standardizes a diagnostic image, an area dividing unit 230 that extracts an area of a notable tissue from the standardized diagnostic image, a slice location determining unit 240 that determines a slice location in the diagnostic image after standardization based on a feature of the notable tissue divided into areas, a measurement unit that measures the notable tissue at the slice location determined by the slice location determining unit (here, a notable tissue extracting unit 250 and a line segment calculating unit 260), a diagnostic index calculating unit 270 (hereinafter referred to as an index calculating unit) that calculates an index by using a measurement value of the notable tissue measured by the measurement unit.

The statistical analysis unit 30 performs statistical processing of an index and generation of a standard image for a large number of images including images processed by the image processing unit 20. In the embodiment, the image processing unit 20 selects or generates a standard image to be referred to when selecting the slice location for the measurement image.

Main elements of the image analysis device 100 can be installed in a computer (a workstation) including a memory and a CPU or a GPU, and functions of the main elements are implemented by allowing the computer to read a program. However, some functions of the image analysis device 100 can also be implemented by hardware such as a programmable logic device (PLD) or the like.

Figure 3:
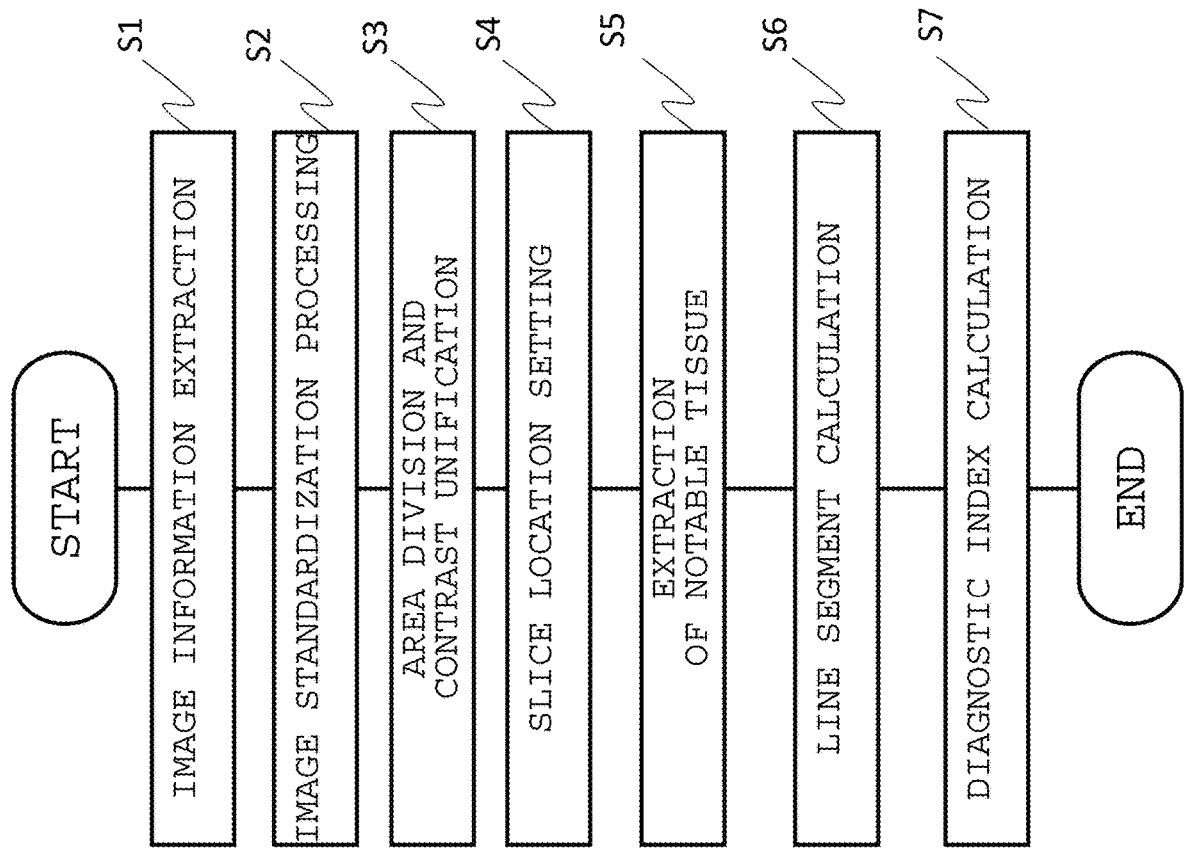
FIG. 3 is a diagram illustrating a processing flow of the image analysis device.

Next, an outline of an operation of the image analysis device 100 having the above-described configuration will be described. FIG. 3 shows an operation flow.

First, the image acquiring unit 10 acquires DICOM information together with image data, and the image information extracting unit 210 extracts pieces of information such as a modality (MR/CT), 2D/3D, an imaging cross section, a contrast, a FOV, a resolution, or the like from the DICOM information (S1). Next, the image standardizing unit 220 performs processing of causing a parameter of an image and a location thereof such as the FOV, the resolution, or the like that are different depending on an image to match a predetermined value and location (a standard value or a standard location) (S2).

Next, the area dividing unit 230 extracts an area of a notable tissue by segmentation from the image after standardization (S3). The segmentation divides an area, based on a difference in pixel values depending on the tissue, from a modality (an MR image, a CT image, or the like) extracted from the DICOM information and contrast information. At this time, in this area division (the area extraction), the area dividing unit 230 allocates a predetermined pixel value for each tissue in the segmented image, regardless of a modality of an original image and an image type thereof (a contrast difference), or the like. Accordingly, a segmentation image of contract that does not depend on the contrast of the original image can be obtained.

Next, the slice location determining unit 240 determines a slice cross section to be measured by using the segmentation image (S4). The slice location determining unit 240 generates a binary image of a predetermined notable tissue from the segmentation image, aligns the generated binary image with a pre-standard image in which a slice location suitable for calculating an index is empirically known, and determines a slice location. The pre-standard image (hereinafter, simply referred to as a standard image) is an image in which the statistical analysis unit 30 has determined a slice location used for calculating an index by averaging images acquired from a large number of subjects in advance, and is standardized to the FOV used for standardization by the image standardizing unit 220, the standard value of resolution, and the standard location of the subject.

When the slice location is determined, the notable tissue extracting unit 250 extracts a notable tissue to be measured from the segmentation image of the slice location (S5). The notable tissue to be extracted may be the same as the notable tissue (the area) used in the slice determination, or may be different therefrom. Since the notable tissue to be measured is determined by an index to be calculated, and the area dividing unit 230 allocates the predetermined pixel value to each divided area, the notable tissue can be automatically extracted when the index is determined. That is, the area of the notable tissue is determined based on a location, a shape, and a size of the notable tissue.

The line segment calculating unit 260 calculates a predetermined line segment for the extracted notable tissue (S6). The line segment varies depending on the notable tissue and the index calculated by the index calculating unit 270. The specific method will be described later, and it corresponds to a doctor's work of measuring a width and an angle of a predetermined location of the notable tissue based on an image. That is, a line segment at a location having the maximum width and a line segment at a location that becomes a tangent line or the like are calculated based on a shape feature of the notable tissue.

Finally, the index calculating unit 270 calculates the index by using the calculated line segment and outputs a result to an output device such as a display device or the like (S7).

According to the embodiment, by standardizing the image and then performing the area division in which the pixel values of the respective areas are unified, it is possible to minimize modality dependence, imaging condition dependence, and imaging location dependence when the index calculation is performed. According to the embodiment, the slice is determined based on the shape feature of the notable tissue, and the notable tissue is determined based on the location, the shape, and the size of the notable tissue, thereby making it possible to minimize subject dependence of the slice location and the notable tissue. As described above, the index can be automatically calculated with high accuracy.

Second Embodiment

Next, an embodiment, in which an image is a brain image and an index to be calculated is Evans Index and a corpus callosum angle, will be described.

Since an outline of the configuration and processing of the device (FIG. 3) is the same as that of the first embodiment, details of a function and an operation of each unit of the image processing unit 20 will be mainly described below.

Figure 4A:
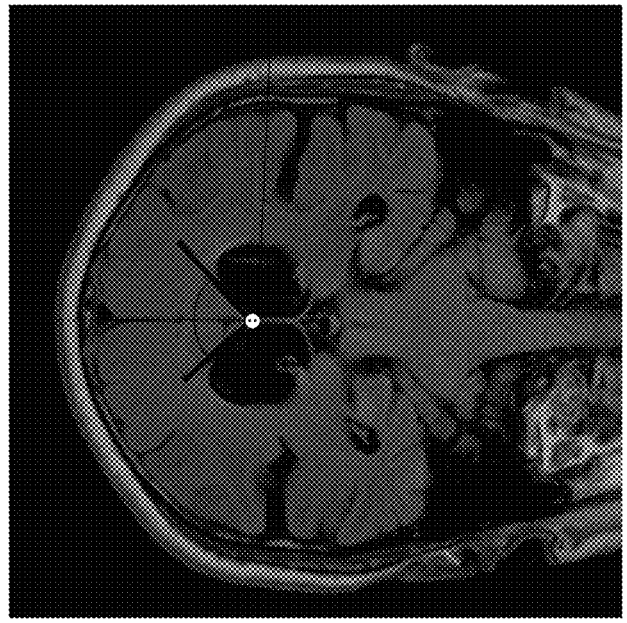
FIGS. 4A and 4B are diagrams explaining an index measured from a brain image.
Figure 4B:
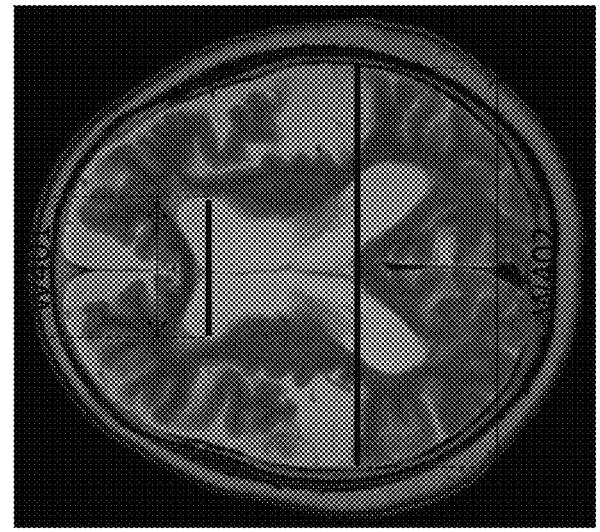

FIGS. 4A and 4B are views showing an axial plane and a coronal plane of the brain image. In Evans Index, as shown in FIG. 4A, when a ratio (W401/W402) of a ventricle anterior horn width W401 to a cranial cavity width W402 exceeds 0.3, the index becomes one index for iNPH diagnosis. As for the corpus callosum angle, one index of the iNPH diagnosis is that the corpus callosum angle in an MRI coronal section (a cross section perpendicular to a straight line connecting an anterior commissure and a posterior commissure) passing through the posterior commissure is steep, specifically 90 degrees or less. Therefore, for Evans Index, the slice location is determined in an axial cross section, and a brain ventricle and brain parenchyma are treated as the notable tissues. For the corpus callosum angle, the slice location is determined in a coronal cross section, and the brain ventricle is extracted.

In this embodiment as well, the image acquiring unit 10 acquires the DICOM information together with the image data, and the image information extracting unit 210 extracts the information such as the modality (MR/CT), the 2D/3D, the imaging cross section, the contrast, the FOV, the resolution, or the like from the DICOM information (S1), which is the same processing as that of the first embodiment. Hereinafter, details of the processing after S2 in FIG. 3 when the brain image is targeted will be described.

<Image Standardization Processing: S2>

Figure 5:
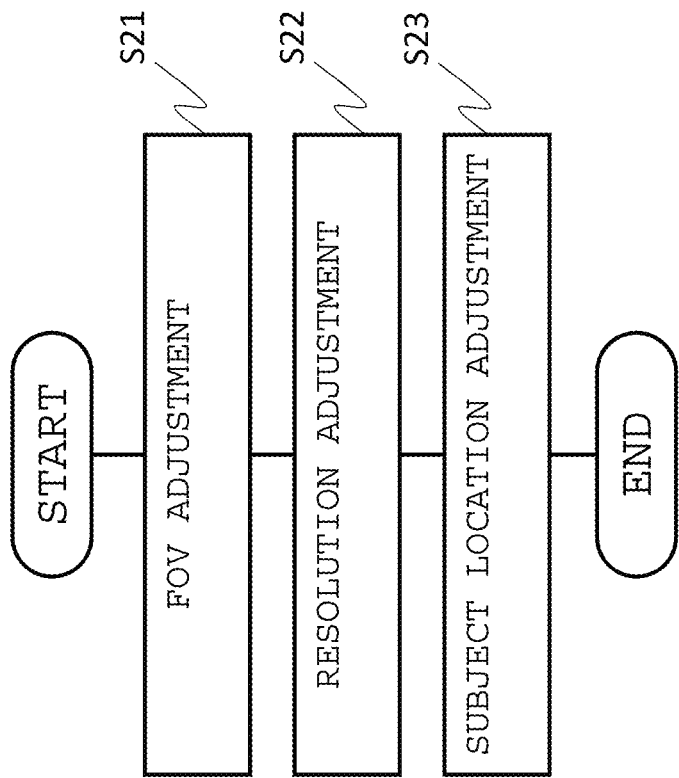
FIG. 5 is a diagram illustrating a procedure of image standardization processing.

As illustrated in FIG. 5, the image standardizing unit 220 performs FOV adjustment (S21), resolution adjustment (S22), and subject location adjustment (S23). As a parameter value to be a standard, a value most suitable for measuring an index to be measured is set in advance. When a measurement target is, for example, Evans Index, FOV: 300 mm, resolution: 1 mm, or the like are set as standard values, and the FOV and the resolution of the measurement image are adjusted to be the standard values. The FOV is adjusted by performing processing of cutting off an excess area or zero filling a periphery according to the standard value (S21).

Regarding the resolution, for example, when the resolution is larger than the standard value (for example, 2 mm), a space between the pixels is filled by linear interpolation or the like to match the standard value (S22). The above-described processing is either two-dimensional processing or three-dimensional processing depending on whether image data is a multi-slice image of 2D or a 3D image.

The image standardizing unit 210 further performs adjustment of a subject location in the image (S23). The location adjustment is performed by, for example, parallel movement and angle correction of a center location of the brain so that a center of the brain becomes a center of the image. The center location of the brain may be obtained by adopting any one of a method for generating a head outer shape mask (an image obtained by binarizing the inside and outside of a head outer shape) from an image of the subject (a diagnostic image) and obtaining a gravity center location of the mask as the center of the brain, and a method for performing elliptic approximation of the head outer shape mask of an axial surface and obtaining a center of an ellipse as the center of the brain. With respect to the coronal plane, the center of the brain may be determined by using symmetry of the head and landmarks such as a top of the head, an eyeball, or the like.

In the case of 3D image data, a center location of a plurality of cross sections (for example, the axial plane and the coronal plane) may be determined, and an intersection of lines which pass through the respective center location and perpendicular to the respective cross section may be determined as a center of the 3D image data. By the above-described processing, the measurement image is standardized to an image in which the FOV and the resolution are unified and the brain center is the image center.

<Area Dividing Processing: S3>

When dividing the area by segmentation, the area dividing unit 230 first acquires information of a modality (an MR image, a CT image, or the like) and contrast from the DICOM information, and divides an area based on a difference in pixel values depending on a tissue. In the case of the MR image, the contrast information varies depending on a type of image determined by an imaging condition, and in the case of a T2-weighted image, a cerebrospinal fluid is depicted as a highest signal area and a bone is depicted as a lowest signal area. Therefore, the area division can be performed in a manner that the highest signal area is defined as the cerebrospinal fluid, the lowest signal area is defined as the bone, and the rest thereof is the brain parenchyma. In the same manner, in the case of a T1-weighted image, the cerebrospinal fluid is depicted as a center signal area, the bone is depicted as the lowest signal area, and in the case of a FLAIR image, the cerebrospinal fluid and the bone are depicted in black, such that these can be segmented as the lowest signal areas. In the case of the CT image, the contrast is determined by a CT value of each tissue, such that segmentation can be performed based on the CT value thereof.

A segmentation method can be performed by a well-known method such as a k-means method, an area expansion method, or semantic segmentation which is one of deep learning that correlates a category with all pixels in the image, thereby making it possible to obtain an image (a segmentation image) representing a brain tissue: the cerebrospinal fluid, the bone, the brain parenchyma (a white matter and a gray matter), or the like with a single pixel value (a luminance value) respectively. At this time, the area dividing unit 230 adds a predetermined pixel value (a label) to the pixel value of each divided tissue, regardless of a modality of an original image and an image type thereof (a contrast difference) in the segmented image. That is, the resolution of the pixel value varies depending on an image, and the image is divided into a predetermined number of levels (for example, the number of notable tissues), such that predetermined pixel values are allocated regardless of a type of the original image, for example, the white matter is set to a pixel value of 1, the gray matter is set to a pixel value of 2, the cerebrospinal fluid is set to a pixel value of 3, or the like. Accordingly, a segmentation image having a unified contrast can be obtained, such that the following processing can be performed without depending on the image type.

<Slice Location Determination: S4>

The slice location determining unit 240 determines a slice cross section to be measured by using the segmentation image. In the case of 2D image data, since the 2D image data is formed of a plurality of slice images, a slice image most suitable for measurement is selected from these slice images. In the case of 3D image data, a plurality of slices are cut out at a predetermined slice distance for a cross section in accordance with a measurement target, and a slice location most suitable for the measurement is determined. Whether the image data is 2D or 3D can be determined from the DICOM information extracted by the image information extracting unit 210, and the above-described processing is performed accordingly. Next, for example, in the case of Evans Index, a slice location of an axial cross section is determined, and in the case of the corpus callosum angle, a slice location of a coronal cross section is determined.

Figure 6:
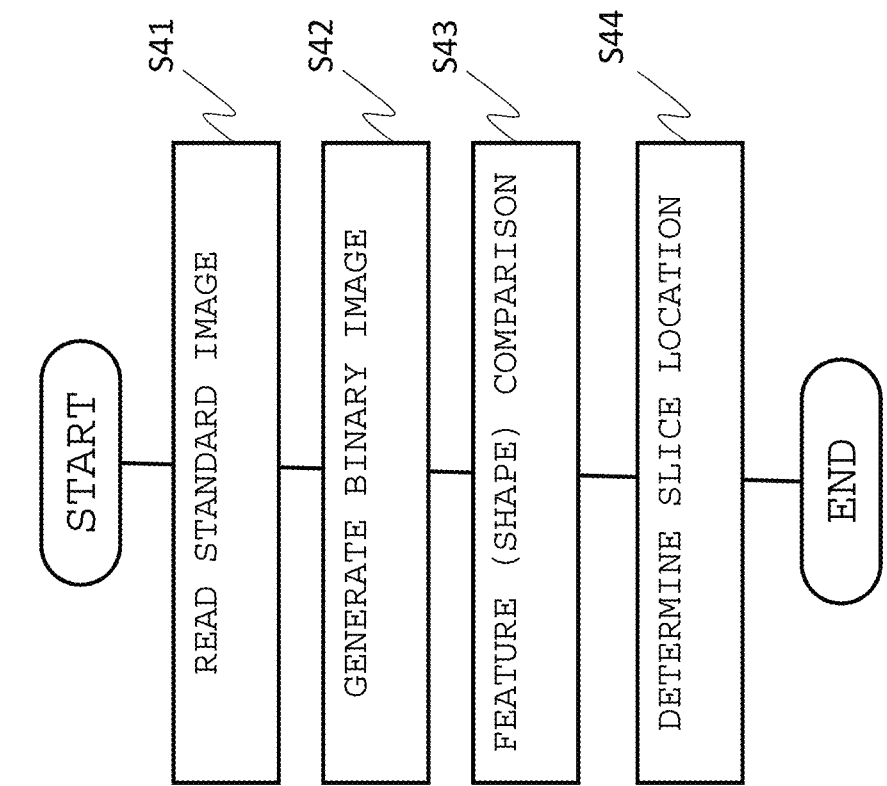
FIG. 6 is a diagram illustrating a procedure of a slice location determination.

In order to determine the slice location, as illustrated in FIG. 6, the slice location determining unit 240 reads a standard image (S41), generates a binary image (S42), compares the generated binary image with a standard binary image (S43), and determines a slice location where an error is minimized (S44).

As described in the first embodiment, the standard image is an image which is generated from a large number of images captured in the past and in which a slice location for calculating a predetermined index is known, and is an image segmented so that a pixel value for each area becomes a reference pixel value, in the same manner as that of the area dividing processing of the diagnostic image. That is, this segmentation image is an image in which the location and pixel value of each area are an average value of a large number of images. The standard image or its segmentation image is generated in advance by the statistical analysis unit 30, and is stored in the storage device 40 or the database 500. The standard image may be generated for each age group such as a child, an adult, an aged person, or the like, and the standard image of the corresponding age group may be read based on the DICOM subject information (S41).

Next, the slice location determining unit 240 generates a reference image from the read standard image, and generates a binary image of the notable tissue (an image in which a pixel value of the notable tissue is set to 1 and the rest thereof is set to 0) from the segmentation image obtained by the area division (S3) (S42). The notable tissue is a tissue in which a shape change for each slice location is clear and the slice location can be easily determined, such as a cerebrospinal fluid area, an eyeball tissue, or the like. The binary image can be obtained by representing the notable tissue and other tissues in the segmentation image with a binary value. The reference image may be generated in advance by the statistical analysis unit 30 for each predetermined notable tissue based on the standard image, and may be read by S41.

The binary image is an image obtained by extracting a feature of a shape of the notable tissue, and the slice location determining unit 240 determines the slice location by using the feature thereof. Therefore, first, an error is calculated by comparing the reference image generated from the standard image with the binary image of the diagnostic image to be measured (S43). Here, an example of a specific method will be described with a case as an example where the notable tissue is the cerebrospinal fluid area.

Figure 7:
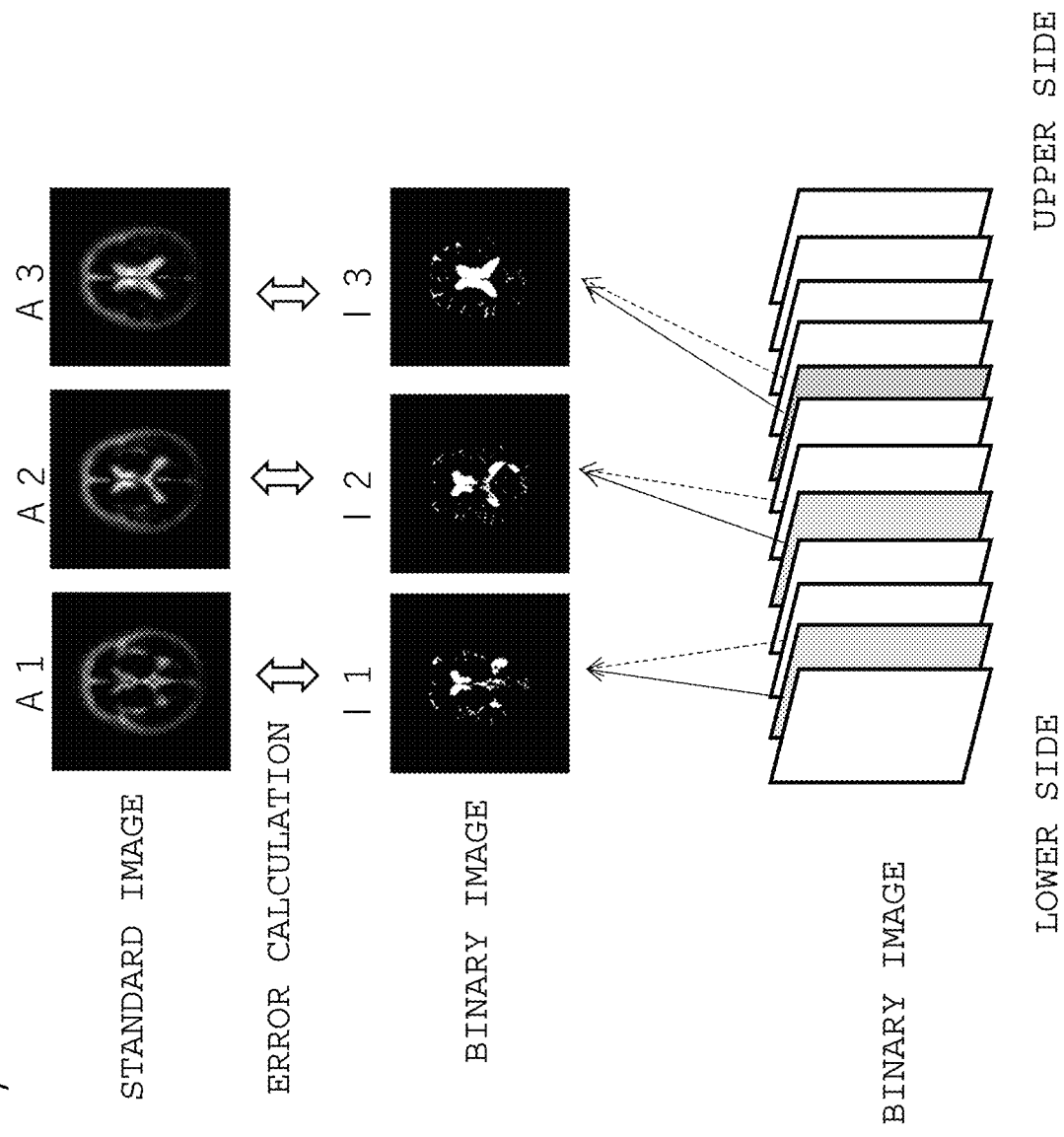
FIG. 7 is a diagram explaining details of the procedure of the slice location determination.

An upper side of FIG. 7 is a reference image generated by averaging a large number of images of cerebrospinal fluid areas captured in the past, and a lower side of FIG. 7 is a binary image of a cerebrospinal fluid area of an image to be measured. Images A1, A2, and A3 at slice locations of two or more (three in this case) from the reference image are compared with binary images I1, I2, and I3 of the two or more measurement images having the same slice distance, and a difference (In −An) (n is any one of 1 to 3) is calculated. A root mean square error (RMSE) represented by equation (1) or a standardized RMSE represented by equation (2) is calculated from a difference between corresponding images (a reference image and a binary image of a diagnostic image). Although standardization is not essential in the calculation of RMSE, the standardization can eliminate an influence in which an error changes depending on a size of the notable tissue, that is, an influence on a calculation result caused by different sets to be compared with each other.

[Equation 1]

$$\sqrt{(\Sigma(In-An)^2)} \quad (1)$$

[Equation 2]

$$\sqrt{(\Sigma(In-An)^2/\Sigma An^2)} \quad (2)$$

FIG. 7 illustrates a case where three images are compared with each other, one of the reference images A1, A2, A3 is an image of a slice location S0 used for measuring the index, and the other two images are images of slice locations separated from the slice location S0 with a predetermined distance. The binary images I1, I2, I3 of the diagnostic images are three images at slice locations separated with the same distance as the reference images. A distance between the images may be the same or different with respect to an image in the middle, and the images may be adjacent to each other, or apart from each other to a certain extent. However, a distance between the reference images and a distance between the binary images of the diagnostic images are the same.

Figure 8:
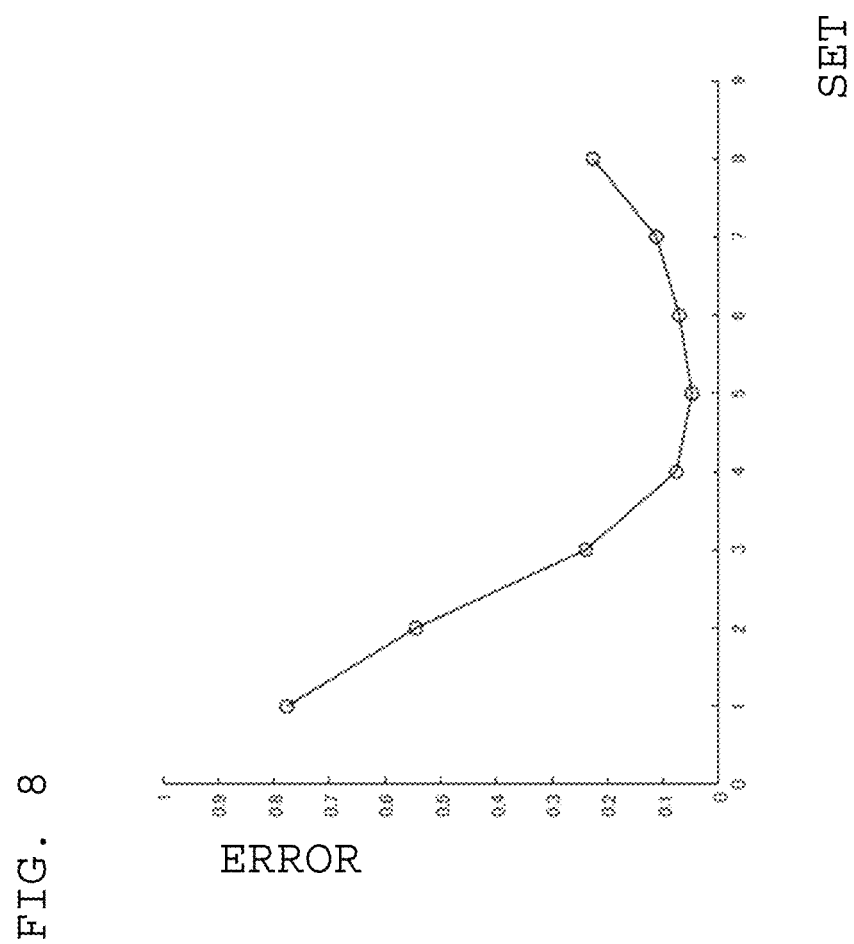
FIG. 8 is a diagram explaining the slice location determination.

The slice location of the diagnostic image (images in the lower side of FIG. 7) is sequentially shifted while the slice distance maintains the same relationship as the previous three images, a set of three images (I1, I2, I3) with which difference from three reference images should be calculated is changed (a new set is selected), and the root mean square error is calculated for each set. When the root mean square error is calculated for a plurality of sets, as illustrated in FIG. 8, a set of three images having the minimum value is obtained. Since a slice location at a center of this set is a location corresponding to the slice location S0 of the reference image, this slice location is used as the slice location of the diagnostic image (S44).

The example illustrated in FIG. 7 describes a case in which the set of reference images includes the slice location in which the slice location S0 is located at the center. In this processing, however, it is only necessary to know a location relationship between the reference image in which the slice location S0 is confirmed and the binary image of the diagnostic image. Accordingly, it is not necessarily required to set a setting so that the slice location S0 is located at the center. The location relationship can be obtained more accurately by using the images of three slice locations, but can also be obtained by using images of two slice locations. That is, the number of images of slice locations is not limited to three.

Since it is only necessary to obtain the location where the difference is the minimum, it is not necessarily required to perform the above-described repeated calculation for all the diagnostic images. With respect to the slice locations included in the entire set, the slice locations may be separately selected so that the center of the image is sandwiched between the slice locations of both sides. Regarding the difference, an example of calculating the root mean square error is described here, and other indexes of the difference, such as a mean square error or the like, may be used.

In the above description, the slice location is determined by using the error of the notable tissue from the average shape (the standard image), and it is also possible to use a feature other than the shape, such as an index representing a feature such as an area, a contour length, or the like.

A predetermined slice location can be set by the same method even when the measurement cross section is an axial cross section or a coronal cross section. In the 3D image data, the slice location may be determined by comparing the binary images of both the axial cross section and the coronal cross section.

<Notable Tissue Extraction: S5>

When the slice location determining unit 240 determines the slice location as described above, the notable tissue extracting unit 250 extracts the notable tissue for measurement from the image of the slice location determined by. For example, in the case of Evans Index measurement, the width of the ventricle and the width of the cranial cavity are measured, such that the ventricle and the brain parenchyma (a brain lumen) are extracted. The notable tissue is extracted based on a signal value of each area divided by segmentation. With respect to the corpus callosum angle, only the ventricle is extracted.

The notable tissue extraction may be performed only with an image of one determined slice location, and in the embodiment, in order to improve the accuracy of index calculation, it is desirable to perform the notable tissue extraction for images of slice locations in the vicinity thereof, for example, an image of a slice location in front of the one determined slice location and an image of a slice location at the rear thereof.

<Line Segment Calculation: S6>

Next, the line segment calculating unit 260 performs a predetermined measurement on the extracted notable tissue (a predetermined slice location and slice locations in the vicinity thereof).

In the case of Evans Index, as illustrated in FIG. 4A, since a maximum width between anterior horns of bilateral ventricles to be measured is known to be in a rear half from a center location of the brain, with respect to the extracted ventricle, a line segment that maximizes the width of the ventricle is calculated for a rear half (an upper half) of the axial cross section and used as the maximum width between the anterior horns of the bilateral ventricles. Since it is known that the cranial cavity width is in a front half, a width of the brain parenchyma is measured for a lower half of the axial cross section, and a line segment that becomes the maximum width is calculated and used as the cranial cavity width.

When the notable tissue is also extracted for the neighboring slices, for the neighboring slices as well, first a maximum width between anterior horns of bilateral ventricles is calculated, a slice having the largest maximum width among a predetermined slice and slices in the vicinity thereof is determined as a measurement target, and a cranial cavity width at a slice location of the determined slice is calculated. Normally, there is a distance of 6 to 7 mm between slices of MR images. Therefore, the maximum width between the anterior horns of the bilateral ventricles may slightly deviate from the slice location determined in the slice location determination step S4. By calculating the maximum width between the anterior horns of the bilateral ventricles for the neighboring slices, it is possible to determine the proper slice location to be measured among a plurality of slices including the neighboring slices, and the maximum width between the anterior horns of the bilateral ventricles and the cranial cavity width can be measured at the slice location.

In the case of the corpus callosum angle, with respect to the ventricle extracted in the coronal cross section, a center line along a sulcus of brain (a dotted line L in FIG. 4B) and a nearest contact point between the left and right ventricles (a point P in FIG. 4B) are determined, left and right tangent lines having a ventricular shape toward the top of the head from the point P are obtained, and two line segments are calculated. For example, with respect to the tangent line, when the point P is set first and an angle of the dotted line L is changed, a line segment where the line segment and a contour of the ventricle meet can be determined as the tangent line. The two line segments are calculated by using only the coronal cross section here. When the image data read by the image processing unit 20 is a 3D image, or when image data of a sagittal cross section is also included, for example, an image of a sagittal surface can be used to determine the point P, such as determining a center line or the like. In the above description, the tangent line is obtained, but it is possible to use other methods in which a line connecting left and right points of a ventricular shape existing at a predetermined distance from the point P and the point P is determined as a line segment.

<Index Calculation: S7>

Finally, the index calculating unit 270 calculates an index by using a calculation result of the line segment calculating unit 260. That is, the maximum width between the anterior horns of the bilateral ventricles is divided by the cranial cavity width to obtain Evans Index. An angle formed by the two line segments calculated based on the point P is calculated to obtain the corpus callosum angle.

The index calculated by the index calculating unit 270 may be output as a numerical value via the UI unit 50 attached to the image analysis device 100, or in the image analysis device 100, the index may be transmitted to another image processing device, and may be output as medical findings integrated with other iNPH findings or the like. In the statistical analysis unit 30, along with a result calculated from a large number of diagnostic images in the past, a map of Evans Index and the corpus callosum angle can also be displayed for each age, and a location of a target subject on the map can also be displayed in an identifiable manner.

By the above-described processing, the calculation of the index for the diagnostic image to be measured is completed, and the data (the segmentation image or the binary image, and the information on the determined slice location) for the diagnostic image may be transmitted to the statistical analysis unit 30. The statistical analysis unit 30 can update standard images that are already generated (an averaged segmentation image and a binary image of a predetermined area) by using the transmitted data.

According to the embodiment, Evans Index, which is a diagnostic index of iNPH, the slice location for measuring the corpus callosum angle, and the notable tissue can be determined without depending on a type of diagnostic image to be input and an individual difference of the subject, such that the diagnostic index can be automatically calculated with high accuracy and provided.

After the slice is determined, the accuracy of determining the maximum width can be improved by also measuring the neighboring slices.

It is not always possible to acquire the image data of the sagittal cross section depending on a facility or an inspection flow. In the embodiment, however, since the index can be calculated from one cross section, it is possible to cope with a situation where all data sets are not available.

While the embodiment describes a case in which two diagnostic indexes of iNPH are calculated, the present invention also includes a case in which only one diagnostic index thereof is calculated.

Modification of Second Embodiment

The second embodiment describes a case in which Evans Index and the corpus callosum angle, which are numerical indexes, are obtained. It is also possible to obtain information related to DESH findings by applying the same method. Hereinafter, acquisition of the information related to the DESH findings will be described.

In Alzheimer's disease and iNPH, brain atrophy occurs in different manners. While the former is accompanied by overall brain parenchymal atrophy, the latter is accompanied by unbalanced enlargement of a subarachnoid space, and such findings are referred to as the DESH findings. A numerical index is not provided in a guideline for the DESH findings, but as seen in an image, in Alzheimer's disease, the brain parenchyma on the top of the head is sparse (sparsely filled) whereas such findings are not seen in iNPH. In the embodiment, in order to find a feature of such DESH findings, the ventricle and the brain parenchyma (the brain lumen) are extracted as the notable tissues, and an area of the brain parenchyma is calculated. A cross section for extracting the notable tissue is desirably a coronal cross section, and information on an axial cross section or both cross sections may be used together.

In this modification as well, the basic processing flows (the image information extraction (S1), the image standardization (S2), the area division (S3), the slice location determination (S4), and the notable tissue extraction (S5)) are the same as the processing flows of the second embodiment illustrated in FIG. 3. Hereinafter, the modification will be described focusing on a point different from that of the second embodiment.

After determining the slice location by using the binary image generated from the segmentation image (S1 to S4), the notable tissue extracting unit 250 extracts the ventricle and the brain parenchyma by using the slice image (S5). The same processing may be performed on the slice images in the vicinity thereof.

Figure 9B:
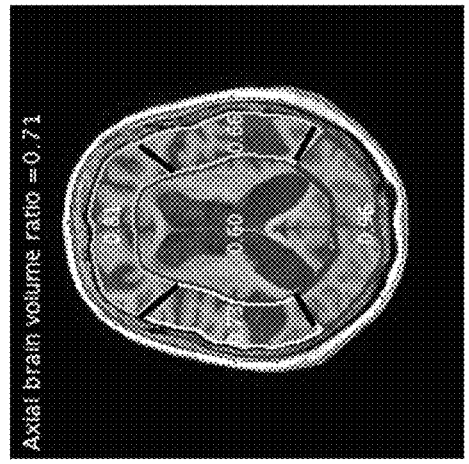
FIGS. 9A and 9B are diagrams explaining index calculation of a modification.
Figure 9A:
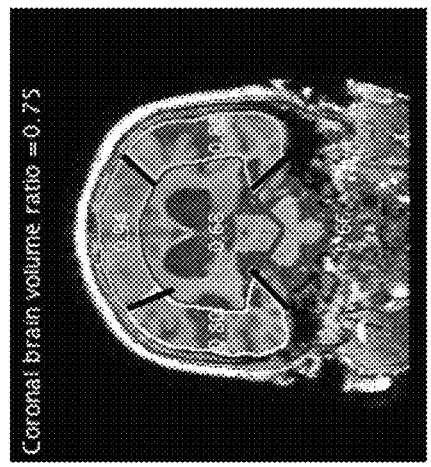

Next, the line segment calculating unit 260 calculates a line segment for further dividing the area of the brain parenchyma of the extracted cross section. In the axial cross section, as illustrated in FIG. 9A, for example, four line segments that divide the area of the brain parenchyma surrounded by an outer shape of the ventricle and a shape reduced therefrom and existing at a predetermined distance from the center of the brain into four small areas are determined. The four line segments may be line segments of which angles from the center of the brain are evenly spaced, or may be determined based on a reference of another shape. In the coronal cross section, as illustrated in FIG. 9B, an area of the brain parenchyma surrounded by an outer shape of the brain parenchyma and the brain parenchyma surrounded by a similar shape separated therefrom for a predetermined distance is divided into three small areas by four line segments (line segments that divide the area and line segments that determine both ends of the area).

In this modification, the line segment calculating unit 260 (the measurement unit) calculates an area (a volume) of the divided small areas. The area thereof can be calculated as the sum of pixel values. When calculation is performed on a predetermined slice and a vicinity thereof, an average value thereof may be used as the area of the small areas.

The index calculating unit 270 provides information related to the DESH findings based on the area (the volume) of each small area. The information on the DESH findings may be calculated by using, as indexes, an area ratio and a volume ratio of the small areas, comparison with an average value of values of a normal person and a patient diagnosed with Alzheimer's disease, or the like.

This modification may be processing specialized for the DESH findings, and can be contributed to the diagnosis of iNPH by being performed together with the processing of the second embodiment and provided together with Evans Index and the index of the corpus callosum angle.

While the second embodiment and its modification describe an example in which the iNPH index from the brain image is calculated, the present invention can be applied to brain diseases other than iNPH and a part other than the brain in the case of a technique for determining a cross section and automatically measuring a notable part, such that measurement can be performed by avoiding modality dependence, image type dependence, subject dependence, or the like.

What is claimed is:

1. An image analysis device, comprising:
   an image receiving unit configured to input a diagnostic image and an imaging condition of the diagnostic image;
   an image standardizing unit configured to standardize the diagnostic image;
   an area dividing unit configured to extract a divided area of a notable tissue from the diagnostic image standardized by the image standardizing unit,
   the area dividing unit extracting the divided area based on the imaging condition so that each pixel of the divided area of the notable tissue is given a same predetermined pixel value;
   a slice location determining unit configured to determine, based on a feature of the area-divided notable tissue, a particular slice location, among plural slice locations, in the standardized diagnostic image, a slice image at the particular slice location being most suitable for measurement, amongst the plural slice locations;
   a measurement unit configured to determine a notable tissue to be measured at the particular slice location, and to measure the notable tissue at the particular slice location determined to be most suitable for measurement, amongst the plural slice locations; and
   an index calculating unit configured to calculate an index by using a measurement value of the notable tissue at the particular slice location, measured by the measurement unit,
   wherein the slice location determining unit determines, based on a difference between (a) a set of pre-standard images associated with corresponding slice locations, in which a reference slice location for calculating the index is determined in advance of obtaining the diagnostic image, and (b) diagnostic images associated with the plural slice locations, a slice location corresponding to the reference slice location associated with the pre-standard images as the particular slice location.

2. The image analysis device according to claim 1, wherein the imaging condition includes a type of an imaging device acquiring the diagnostic image, a dimension of an image, a contrast of the image, an FOV, and a resolution.

3. The image analysis device according to claim 1, wherein the image standardizing unit performs standardization for causing an FOV and a resolution which are included in the imaging condition, and a subject location to match a predetermined standard value and a standard location.

4. The image analysis device according to claim 1, wherein
   the slice location of the diagnostic image having minimum difference is determined to be corresponding to the reference slice location of the pre-standard image.

5. The image analysis device according to claim 1, wherein the plurality of slice locations are different slice locations having the same cross section.

6. The image analysis device according to claim 1, wherein the plurality of slice locations are slice locations having different cross sections.

7. The image analysis device according to claim 1, further comprising: a statistical analysis unit configured to generate the pre-standard image by using a large number of diagnostic images.

8. The image analysis device according to claim 1, wherein the measurement unit sets a line segment for calculating the index with respect to the notable tissue.

9. The image analysis device according to claim 8, wherein
   the notable tissue includes at least a part of a ventricle and brain parenchyma, and
   the measurement unit calculates a line segment having a maximum width of an anterior horn of the ventricle and a line segment having a maximum width of the brain parenchyma.

10. The image analysis device according to claim 8, wherein
    the notable tissue includes at least a part of a ventricle, and
    the measurement unit calculates a tangent line of the ventricle as two line segments for determining a corpus callosum angle.

11. The image analysis device according to claim 1, wherein the measurement unit is configured additionally to divide the notable tissue into a plurality of small areas and calculates a volume of the small areas.

12. The image analysis device according to claim 11, wherein the index calculating unit calculates, based on the volume of the small areas, a qualitative or quantitative index related to DESH findings of idiopathic normal pressure hydrocephalus.

13. The image analysis device according to claim 1, wherein
    the diagnostic image is a brain image, and
    the index calculated by the index calculating unit includes at least one of Evans Index which is a diagnostic index of idiopathic normal pressure hydrocephalus, and a corpus callosum angle.

14. An image analysis method for inputting a diagnostic image and calculating an index of a specific disease, the method comprising:
- a step of inputting the diagnostic image and an imaging condition of the diagnostic image;
- an image standardizing step of standardizing the diagnostic image;
- an area dividing step of extracting a divided area of a notable tissue from the standardized diagnostic image, the divided area being extracted based on the imaging condition so that each pixel in the divided area of the notable tissue is given a same predetermined pixel value;
- a slice location determining step of determining a particular slice location, among plural slice locations, in the standardized diagnostic image, based on a feature of the area-divided notable tissue, a slice image at the particular slice location being most suitable for measurement, amongst the plural slice locations;
- a step of measuring a notable tissue at the particular slice location determined to be most suitable for measurement, amongst the plural slice locations; and
- an index calculating step of calculating an index by using a measurement value of the measured notable tissue at the particular slice location,
- wherein in the slice location determining step, it is determined based on a difference between (a) a set of pre-standard images associated with corresponding slice locations, in which a reference slice location for calculating the index is determined in advance of the step of inputting the diagnostic image, and (b) diagnostic images associated with the plural slice locations, a slice location corresponding to the reference slice location associated with the pre-standard images as the particular slice location.

15. The image analysis method according to claim 14, wherein
the diagnostic image is an image acquired by an MRI device,
the imaging condition includes a type of an imaging device acquiring the diagnostic image, a dimension of an image, a contrast of the image, a FOV, and a resolution, and
the image standardizing step performs standardization for causing the FOV, the resolution, and a subject location to match a predetermined standard value and a standard location.

16. The image analysis method according to claim 14, wherein
the diagnostic image is a brain image, and
the index calculated in the index calculating step includes at least one of Evans Index which is a diagnostic index of idiopathic normal pressure hydrocephalus, a corpus callosum angle, and a qualitative or quantitative index related to DESH findings.

17. An image analysis device for processing an image corresponding to a brain, comprising:
- an image receiving unit configured to input a diagnostic image corresponding to the brain and an imaging condition of the diagnostic image;
- an image standardizing unit configured to standardize the diagnostic image;
- an area dividing unit configured to extract a divided area of a notable tissue from the diagnostic image standardized by the image standardizing unit;
- a slice location determining unit configured to determine, based on a feature of the area-divided notable tissue, a particular slice location, among plural slice locations, in the standardized diagnostic image, a slice image at the particular slice location being most suitable for measurement, amongst the plural slice locations;
- a measurement unit configured to determine a notable tissue to be measured at the particular slice location, and to measure the notable tissue at the particular slice location determined to be most suitable for measurement, amongst the plural slice locations; and
- an index calculating unit configured to calculate an index by using a measurement value of the notable tissue at the particular slice location, measured by the measurement unit,
- wherein the notable tissue includes at least a part of a ventricle and brain parenchyma, and the measurement unit determines and sets a plurality of line segments that divide a region of the brain parenchyma in the notable tissue.

18. The image analysis device according to claim 17, wherein the measurement unit calculates an area of each divided region formed by the plurality of line segments.

19. The image analysis device according to claim 17, wherein the measurement unit calculates a corpus callosum angle based on the plurality of line segments.

* * * * *